Patented Oct. 4, 1932

1,880,527

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

ACCELERATOR OF VULCANIZATION

No Drawing.   Application filed October 13, 1927.   Serial No. 226,052.

My invention relates to the vulcanization of rubber and it has for one of its primary objects the provision of a desirable material for accelerating the vulcanization of rubber products. More particularly, it relates to an accelerator which is composed of the reaction product of an aromatic hydroxy aldehyde and an amine.

I have discovered that the reaction products of certain aromatic aldehydes, particularly the aldehydes having a hydroxy group substituted in the aromatic nucleus, and amines such as aniline or toluidine, when incorporated in a rubber compound, materially accelerate the rate of vulcanization and also impart desirable characteristics to the resulting product. An example of such reaction product is that obtained by the interaction of beta hydroxy naphthyl aldehyde and aniline. One of the various methods which may be employed in preparing this product, is described as follows:

Intermix molecular quantities of beta hydroxy naphthyl aldehyde and aniline, and heat these substances under a reflux condenser for several hours. The reaction taking place may be represented as follows:

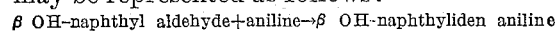

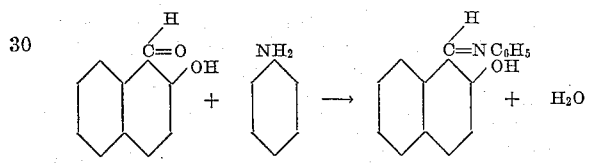

The method of preparation is outlined more in detail in an article by Foss, Bulletin Soc. Chemique, 1901, iii, vol. 25, pages 371-375.

This material is a yellow crystalline compound which, upon being heated, gives off an oil and leaves a resinous mass of unknown chemical structure. The latter material is found to be a desirable accelerator, whereas the yellow crystalline product has little, if any, accelerating properties.

The accelerator may also be prepared by heating molecular quantities of beta hydroxy naphthyl aldehyde and aniline in a closed vessel at a temperature of about 300 degrees for a period of from one to two hours. The reaction product thus obtained is of tar-like consistency and should be dried in a vacuum drier until free from water.

The accelerator may be incorporated in rubber compounds composed of various constituents in varying proportions. The following is an example of a formula which has been found to give excellent results:

|  | Parts |
|---|---|
| Pale crepe rubber | 100 |
| ZnO | 5 |
| Sulfur | 3 |
| Stearic acid | 1.5 |
| Accelerator | .5 |

If the reaction product of beta hydroxy naphthyl aldehyde and aniline constitutes the accelerator in the formula, a relatively short time is required for vulcanization to obtain a product having excellent tensile strength and elongation. This fact is clearly demonstrated by the appended table:

| Accelerator | Time in mins. cure 40 lbs. | Modulus | | Tensile strength | Elong. percent |
|---|---|---|---|---|---|
| | | 500% elong. | 700% elong. | | |
| | | | | $kgs/cm^2$ | |
| Beta hydroxy naphthyl aldehyde and aniline | 30 | 23 | 76 | 162 | 830 |
| | 60 | 26 | 93 | 170 | 805 |
| | 90 | 27 | 93 | 164 | 790 |

Although I have disclosed and described in detail only the preferred embodiments of my invention, it will be apparent to those skilled in the art that the invention is not limited thereto but that various modifications and changes may be made therein without departing from the spirit of the invention or from the scope of the appended claims. It is intended that the patent shall cover, by suitable expression in the appended claims, whatever features of patentable novelty reside in invention.

What I claim is:

1. A rubber product resulting from rubber vulcanized in the presence of an accelerator composed of a reaction product of beta hydroxy naphthyl aldehyde and aniline.

2. A method of vulcanizing rubber which comprises heating a vulcanizable rubber compound in the presence of a $\beta$-hydroxy naphthyliden aniline, which has been fused to a resinous condition.

3. A method of vulcanizing rubber which comprises heating a vulcanizable rubber compound in the presence of a reaction product of β-hydroxy naphthyl aldehyde and aniline, said reaction product having been heated until it has been reduced to a resinous condition.

4. A method of vulcanizing rubber which comprises heating a vulcanizable rubber compound in the presence of a reaction product of β-hydroxy naphthyl aldehyde and aniline, said reaction product having been fused to a resinous condition.

5. A rubber product that has been vulcanized in the presence of a reaction product of β-hydroxy naphthyl aldehyde and aniline, said reaction product having been heated until it is reduced to a resinous mass.

6. A method of vulcanizing rubber which comprises heating it in the presence of a material formed by fusing β-hydroxy naphthyliden aniline to a resinous mass.

7. A rubber product that has been vulcanized in the presence of fused β-hydroxy naphthyliden aniline.

8. A rubber product resulting from rubber vulcanized in the presence of an accelerator composed of a reaction product of a hydroxy naphthyl aldehyde and a primary benzene-substituted amine selected from the group consisting of aniline and toluidine.

9. A method of vulcanizing rubber which comprises heating a vulcanizable rubber compound in the presence of a reaction product of a hydroxy naphthyl aldehyde and a primary benzene-substituted amine selected from a group consisting of aniline and toluidine, said reaction product having been fused to a resinous condition.

In witness whereof, I have hereunto signed my name.

Signed at Akron, in the county of Summit, and State of Ohio, this 11th day of October, 1927.

JAN TEPPEMA.